Figure 1:
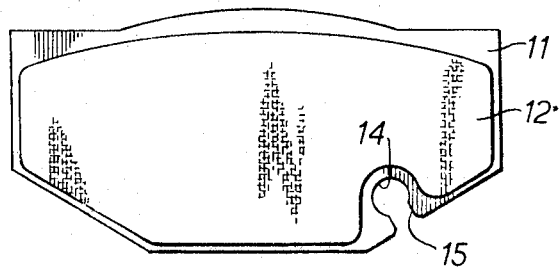

United States Patent [19]
Hess

[11] 3,783,979
[45] Jan. 8, 1974

[54] BRAKE PADS AND WEAR INDICATORS THEREFOR

[75] Inventor: Wolfgang Hess, Koblenz, Germany

[73] Assignee: Girling Limited, Birmingham, England

[22] Filed: May 15, 1972

[21] Appl. No.: 253,349

[30] Foreign Application Priority Data
May 21, 1972  Great Britain................... 16,275/72

[52] U.S. Cl.............. 188/1 A, 200/61.44, 340/52 A
[51] Int. Cl............................................. F16d 66/02
[58] Field of Search.................. 188/1 A; 200/61.44; 340/52 A

[56] References Cited
UNITED STATES PATENTS

| | | | |
|---|---|---|---|
| 3,611,283 | 10/1971 | Anders et al................. | 188/1 A UX |
| 3,670,300 | 6/1972 | Depenheuer................. | 188/1 A UX |
| 3,675,197 | 7/1972 | Bennett et al. ..................... | 188/1 A |

Primary Examiner—Duane A. Reger
Attorney—Samuel Scrivener et al.

[57] ABSTRACT

A disc-brake pad has a wear indicator characterised in that the indicator is separate from the frictional material and is slid into position on the backing plate from one edge thereof. The advantage is that the wear indicator and the leads thereto do not occupy space behind the backing plate.

2 Claims, 6 Drawing Figures

PATENTED JAN 8 1974 3,783,979

SHEET 2 OF 2

3,783,979

BRAKE PADS AND WEAR INDICATORS THEREFOR

The present invention concerns a brake pad for a disc brake and a wear indicator therefor.

A wear indicator as meant in this specification is an electrical conductor which stands proud from a backing plate of the brake pad by an amount equal to the minimum allowable thickness of the brake lining after wear has occurred so that when a dangerous amount of wear has taken place contact is made between the indicator and the brake disc which can be sensed. The conductor can be a loop of wire so that the integrity of the conductor can be monitored but is normally a single probe wire.

Wear indicators are known. However the electrical connections thereto have occupied space behind the brake pad where space is required for other purposes.

According to the present invention, there is provided a brake pad for a disc brake comprising a backing plate having two faces and an external periphery, a lining of friction material attached to one face of the backing plate, and a wear indicator composed of an electrical conductor embedded in an insulating material other than said lining, the conductor providing a projection from said one face standing proud therefrom by an amount equal to the minimum allowable thickness of the lining after wear has occurred, characterised in that the plate and the indicator are complementarily designed so that the indicator can be fitted in a direction parallel to the plane of the backing plate and from one edge of the external periphery, and in that the conductor extends to the edge without projecting more from either face than said amount.

Another aspect of the present invention provides a wear indicator for use in the brake pad of the preceding paragraph comprising a conductor embedded in an insulating material other than a brake lining, characterised in that the insulating material is shaped to engage two faces of the backing plate and the conductor is shaped to project from one of these faces and to extend therefrom to an edge of the backing plate without projecting from either face by more than the minimum allowable thickness of the lining.

Figure 2:
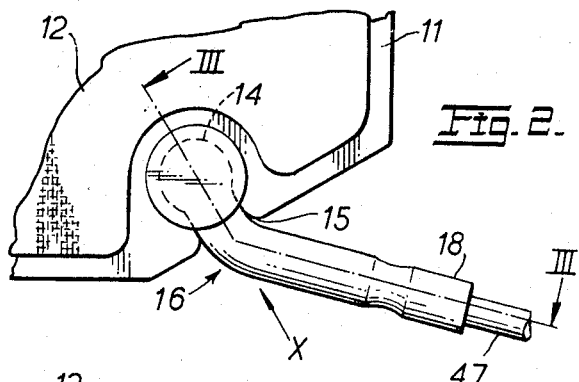
Figure 3:
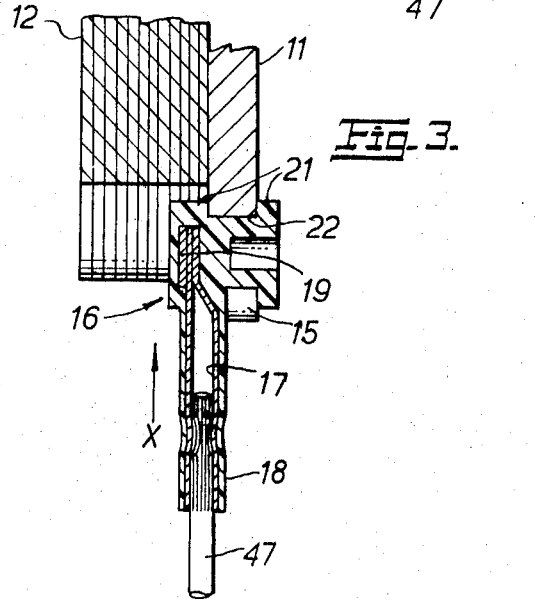
Figure 4:
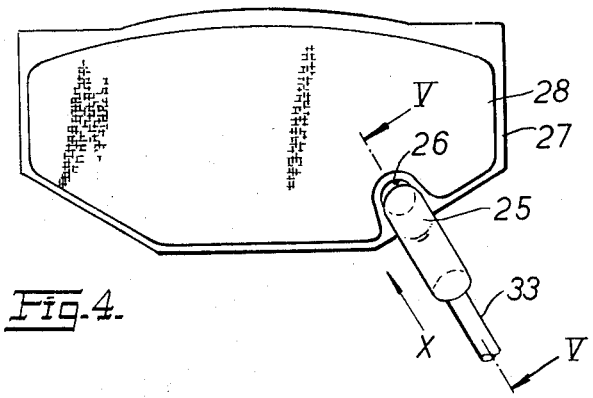
Figure 5:
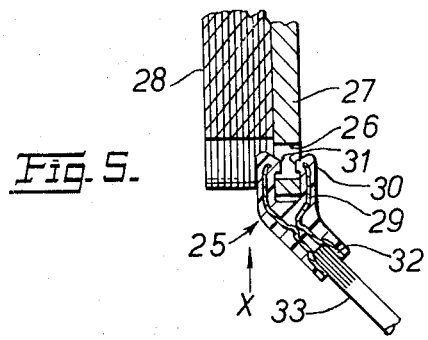
Figure 6:
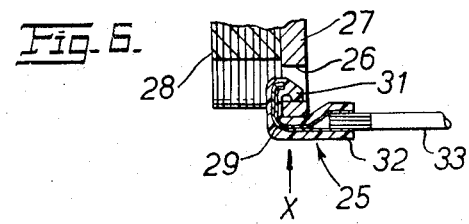

Embodiments of the invention will now be described, by way of example, with reference to the accompanying drawings in which:

FIG. 1 is a face view on a brake pad provided with a hole for fitting a wear indicator, FIG. 2 is a detail showing a wear indicator fitted to the brake pad of FIG. 1, FIG. 3 is a section on line III—III of FIG. 2, FIG. 4 is a face view on another brake pad fitted with a wear indicator, FIG. 5 is a section on line V—V of FIG. 4, and FIG. 6 is a section similar to that of FIG. 5 but showing another form of wear indicator.

The brake pad for a disc brake shown in FIG. 1 comprises a backing plate 11 and a friction lining 12 attached by rivets, bonding, or otherwise to one face of the backing plate. Towards one edge, the backing plate 11 has a hole 14 which is connected to one edge of the external periphery of the backing plate by a slot 15 which is radiussed at that edge to facilitate the insertion of a wear indicator 16 which is designed to be slid along the slot into the hole.

The indicator comprises a conductor 17 embedded in an insulating material 18 which is resistant to oils, greases, hydraulic fluid, water, and other substances it is likely to meet. The plastics material forms a body totally enclosing the conductor except for a socket-like opening where an external wire 47 fits. The plastics material is elastomeric so that it can be slightly compressed as it moves through the slot and then expand to occupy the full diameter of the hole.

The conductor terminates in a projection 19 which stands proud of said one face by an amount equal to the minimum allowable thickness of the lining. The body of insulating material 18 is shaped so as to have abutments 21 to engage on the two opposite faces of the backing plate. These abutments locate the conductor axially of the hole and can be the sides of a groove 22 similar to the groove in a grommet. The conductor extends to the periphery of the backing plate along the slot so that except at the projection it does not project from either face of the backing plate; a small amount of projection is however acceptable if, say, it does not exceed the amount equal to the minimum allowable thickness.

In the embodiment of FIGS. 4 and 5, a wear indicator 25 clips into a hole 26 which provides opposed recesses in two faces of a backing plate 27 to one face of which is bonded a friction lining 28. The wear indicator comprises a conductor 29 embedded in a body of plastics material 30. The conductor is either of strip material bent back on itself or of two separate strips of material held together by the plastics material but in either case at one end the conductor is bifurcated and resiliently urges the plastics material into contact with both faces of the backing plate and causes noses 31 formed in the plastics material to grip in the recesses formed by the hole. At the other end of the conductor, it is formed as a socket 32 which can be crimped onto a wire 33. The conductor is so shaped that it has a projection which extends from said one face by an amount equal to the minimum allowable thickness of the lining but does not project elsewhere from either face by any more than this amount. The conductor as will be seen from the drawings lies substantially flat on both faces.

The embodiment of FIG. 6 is very similar except that the wear indicator is not bifurcated but the socket 32 acts as an anchorage against which the resilience of the rest of the conductor acts. It will be seen that the wear indicator abuts the two faces of the backing plate, the edge, and inside the hole and is therefore securely held.

In all the embodiments the plastics material is not relied on for mechanical strength which is provided by the conductor and the wear indicator is slid onto the backing plate from the edge in the direction of arrow X which is parallel to the backing plate.

I claim:

1. A disc-brake's brake pad comprising a backing plate having a front face to which a lining of friction material is attached and a rear face, the lining not extending to the edge of the plate at least over part of that edge but leaving a margin, the improvement residing in that a hole is provided in the margin and in that the hole is connected to the edge by a slot of narrower width than the hole whereby a waisted body of elastomeric material incorporating a wear indicator can be squeezed along the slot and then open out to lock into the hole.

2. A wear indicator for use with the pad of claim 1 comprising an electrical conductor and a body of elastomeric insulating material in which the conductor is embedded, the improvement residing in that the body is waisted so as to provide shoulders for abutment one on each face of the plate and in that the conductor extends out from the indicator back along the path of intended insertion into the plate whereby when the indicator is fitted to a pad the conductor extends within the slot.

* * * * *